April 15, 1930.  A. W. ROUND  1,755,132
EGG BEATER OR THE LIKE
Filed Dec. 2, 1927
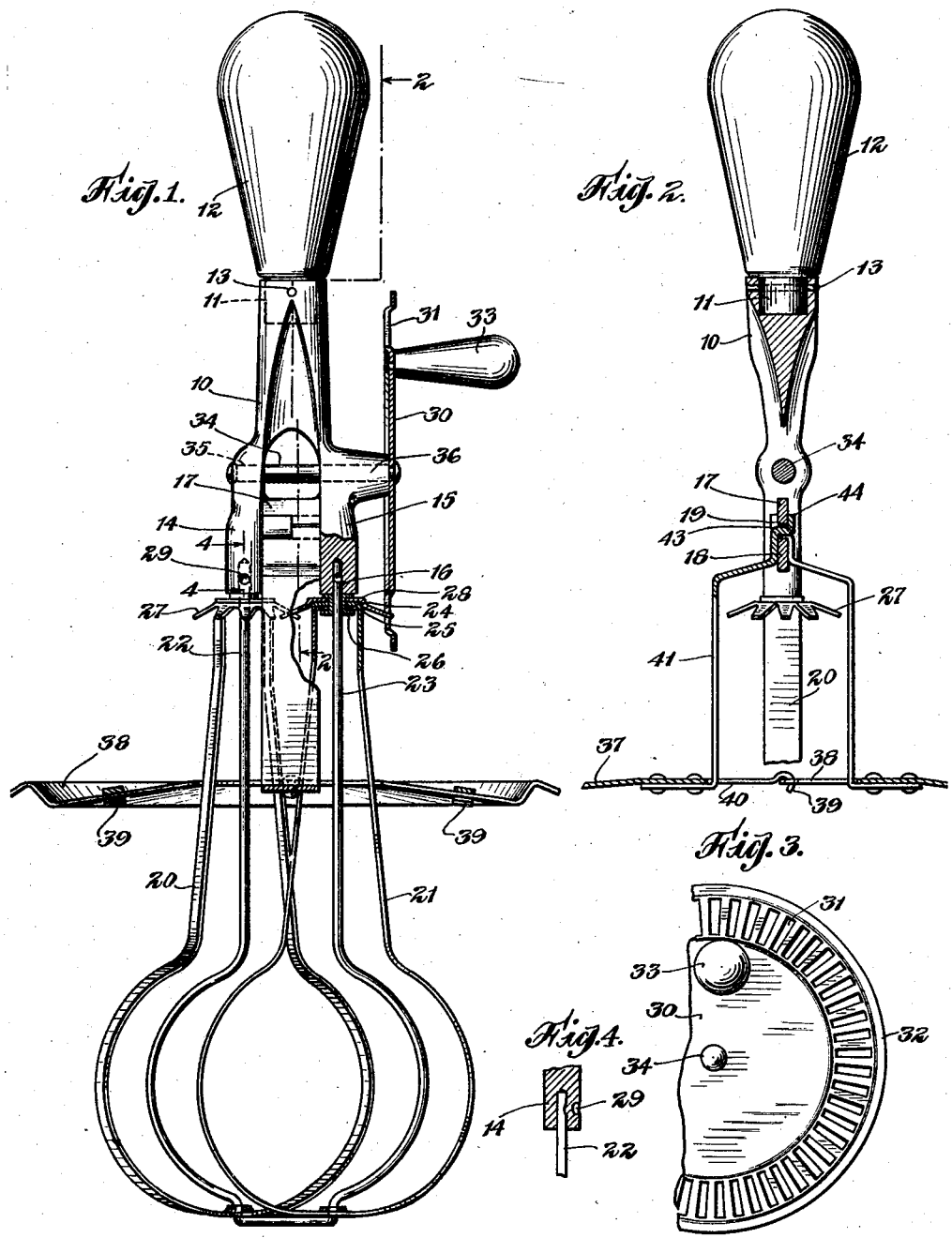
INVENTOR
ALBERT W. ROUND
BY
Ward, Crosby + Smith
ATTORNEYS Patented Apr. 15, 1930

1,755,132

UNITED STATES PATENT OFFICE

ALBERT W. ROUND, OF TORRINGTON, CONNECTICUT, ASSIGNOR TO THE TURNER & SEYMOUR MANUFACTURING CO., OF TORRINGTON, CONNECTICUT, A CORPORATION OF CONNECTICUT

EGG BEATER OR THE LIKE

Application filed December 2, 1927. Serial No. 237,153.

This invention relates to mixers such as egg beaters or the like devices.

The objects of the invention include the provision of an improved, durable and efficient device of this class which is easy and convenient to operate and is inexpensive and relatively simple to manufacture, and the invention according to one of its embodiments includes a quick-detachable receptacle cover.

Further and more specific objects, features and advantages will more clearly appear from the detailed description given below taken in connection with the accompanying drawings which form a part of this specification, the invention consistsing in the novel features, arrangements, and combinations of parts embodied by way of example in the apparatus herein described as illustrating preferred forms of the invention.

In the drawings, Fig. 1 is a side elevational view partly in section, showing a device embodying the invention;

Fig. 2 is a sectional elevational view of parts of the device shown in Fig. 1, the section being taken approximately along the section line 2—2 of Fig. 1;

Fig. 3 is a face view of a part of the operating gear and handle for the device of Fig. 1; and Fig. 4 is an enlarged detail sectional view taken substantially along the section line 4—4 of Fig. 1.

Referring to the drawings in further detail, the device as shown may comprise a rigid frame member 10 upon which the various parts are mounted and secured. This frame member may comprise an integral metallic casting preferably formed of a light weight metal, such as aluminum or an inexpensive alloy thereof. The upper part of the casting may be formed with an aperture 11 for receiving a handle grip 12 made of wood or other suitable material and having a shank fitting the aperture 11 and secured therein as by a transversely extending pin 13. The lower portions of the frame member, although integrally formed, are preferably substantially bifurcated and comprise the two branches 14 and 15 terminating in portions having longitudinal apertures as at 16. The intermediate portions of these two branches are preferably strengthened by web members 17 and 18, spaced so as to leave an aperture 19 between, for a purpose hereinafter described.

The beater may be provided with a conventional form of rotatable dash members 20 and 21 mounted upon vertically extending rods 22 and 23, the upper ends of these rods being received with the longitudinal apertures 16 of the frame member. The lower end of the rod 22 may be bent in the form of a loop in the conventional manner as shown and with its other end extending upwardly to comprise the rod 23.

The upper ends of the beater members 20 and 21 may be bent at right angles and perforated to provide apertured lugs as at 24 and 25 secured together as by an eyelet member 26. The eyelet members are rotatably received upon the supporting rods 22 or 23, and also embrace pinion members as at 27 and 28 formed of sheet metal and held flatwise by the flanges of the respective eyelets against the apertured lugs 24.

The pinions 27 and 28 are preferably mounted so as to rotate in the same general plane, but in order that the sheet metal teeth thereof may have a sufficient effective width for proper interengagement, they may be bent at an angle with said plane whereby the teeth of the respective pinions cross each other in engagement in the manner shown.

When the rods 22 and 23 are assembled in respect to the various rotatable parts thereon, the ends of the rods are inserted within the apertures provided in the frame member and are preferably secured therein in the manner shown in Fig. 4, to wit, the branches of the frame member may each be provided with depressions as at 29 extending into the casting transversely of said apertures to points close to the aperture walls but without intersecting the same. The metal within the base of said depressions may be upset as by the use of a prick punch driven in a direction toward the apertures so that the aperture walls are brought into a firm gripping relationship with the rods 22 and 23.

An operating gear 30 is mounted to rotate in a plane substantially perpendicular to the general plane of the pinions 27 and 28 and with its tooth portions engaging one of said pinions as shown. The gear 30, as shown in Fig. 3, may comprise a disc of sheet metal with slots 31 at its periphery, the side edges of the slots preferably extending radially of the disc, and the ends of the slots being closed by an integral peripheral portion 32. The slots may be spaced apart at a distance approximating their width. It has been found that an operating gear with tooth portions formed in this manner runs quite smoothly, and is a very durable construction, in cooperation with sheet metal pinion members as above described. Furthermore, ordinary wear and bending of the pinion members within reasonable limits does not materially interfere with the free running cooperation of the gear and pinions. The gear 30 may be driven by a handle member as at 33 and may be mounted upon a shaft 34 extending transversely of the frame member 10. The shaft 34 is preferably mounted within a pair of spaced bearing portions as at 35 and 36 integrally formed with the bifurcated frame member respectively at points just above the apertured portions 14 and 15.

In order that the beater gear and pinions may be maintained in smooth running order, it is apparent that the gear and pinion teeth must be kept in proper relationship, which necessitates rigid and durable bearing means for the rotating parts. However, from a practical standpoint, it is also of course of importance to substantially minimize the weight and size of the frame parts to avoid cumbersome constructions of awkward appearance. These various limitations have been efficiently met by the construction here described. The gear shaft 34 is provided with a pair of durable spaced bearings to insure its proper alignment and yet since these bearing portions are located at points just above the apertured portions 14 and 15 which receive the rods 22 and 23, and in the same general plane therewith, substantially no extra metal is required therefor. Each branch of the bifurcated member therefore comprises one of the bearings together with a support for one of the beater rods, and the two branches are strengthened by the intermediate web members without adding appreciably to the weight of the device or detracting from its smooth appearance. A simple light weight unbendable frame is thus provided which insures smooth operation of the gears.

Also, the cast frame member, when formed as shown in the drawings, notwithstanding the double bearing, is substantially free of cracks and crevices as often occur with stamped sheet metal frames and in which dirt and food ingredients may become lodged or concealed.

As shown in the drawings, the beater may be provided with a quick-detachable receptacle cover comprising two substantially semicircular and complementary sheet metal cover portions 37 and 38 detachably joined along the line of separation as by conventional engaging parts 39 arranged so that the two cover portions may be flexed one upwardly and the other downwardly to disengage the same. At the center of the cover, portions may be cut away as at 40 to provide space for the beater members. The cover portions 37 and 38 respectively may have supporting arms 41 and 42 secured thereto and extending upwardly and inwardly to the aperture 19 above referred to, the arms terminating at their upper ends respectively in hook portions 43 and 44 which engage the surface of the web member 18, then pass through the aperture 19 in crossed complementary relationship and thereafter engage the side surfaces of the web member 17. Thus the supporting arms of the respective cover portions are provided a quick-detachable hook engagement with the frame member and while the cover engaging means 39 are in place the cover is securely held in position. However, upon release of the engaging means 39 the cover portions may be swung outwardly, upwardly and then the same are freely removable from the beater, permitting the beater to be used in the ordinary way without a receptacle cover if desired. Sidewise movement of the arms 41 and 42 is prevented by engagement with the portions 14 and 15 of the frame member and further by reason of the manner of engagement of the supporting arms with the walls of the slot 19.

Such construction not only permits the beater to be used with or without the cover but the cover securing means when thus made to be quickly detachable, greatly facilitates proper cleaning of the entire device.

While the invention has been described in detail with respect to a particular preferred example thereof which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. A beater or the like device comprising a frame member having an aperture therethrough, a pair of complementary hook members fitted within said aperture and extending in opposite directions from the frame member to provide supporting arms, a pair of complementary receptacle cover members secured respectively to said supporting arms, and quick-detachable interengaging means on said cover portions.

2. A beater or the like device comprising an apertured frame member, a pair of substantially semi-circular and complementary receptacle cover members provided with a central space for the beater parts, and supporting arms secured to said cover portions and extending to the apertured portion of the frame for quick-detachable hooked engagement therewith.

3. A beater or the like device comprising an apertured frame member, a pair of substantially semi-circular and complementary receptacle cover members provided with a central space for the beater parts, supporting arms secured to said cover portions and extending to the apertured portion of the frame for quick-detachable hooked engagement therewith, and means on said cover portions for retaining the same in complementary relationship.

4. A beater or the like device having a frame member, a two part receptacle cover, supporting arms extending upwardly from the respective parts of said cover, and interengaging means on said frame and supporting arms whereby said arms are secured to the frame when the cover parts are in normal position and whereby said arms may be disconnected from the frame on separation of the cover parts.

5. A beater or the like device having a frame member, a two part receptacle cover, supporting arms extending upwardly from the respective parts of said cover, and interengaging means on said frame and supporting arms whereby said arms are secured to the frame when the cover parts are in normal position and whereby said arms may be disconnected from the frame on separation of the cover parts, said cover parts being formed of resilient material and with interengaging portions which are releasable upon flexing the cover parts.

6. A beater or the like device comprising a frame member having an aperture therethrough, a two part receptacle cover fitting around the beater, and supporting arms for the respective parts of said cover and extending to the apertured portion of said frame, said arms terminating in crossed hook portions fitting within said aperture from the opposite sides of the frame member.

7. A beater or the like device in combination with a receptacle cover fitting around the same, said cover comprising a plurality of parts each having quick-detachable hooked engagement with the beater.

8. A beater or the like device in combination with a receptacle cover fitting around the same, said cover comprising a plurality of parts, said parts having quick-detachable interengaging portions and quick-detachable hooked engagement with the beater.

9. A beater or the like device comprising a substantially bifurcated but integral cast metal frame member, the two branches of which are joined by a handle carrying portion, the ends of the branches being provided with means for receiving rods upon which interconnected rotatable beater elements are mounted, intermediate parts of said branches respectively being formed to provide spaced bearings, a rotatable shaft carried in said bearings, and a drive gear mounted at the end of said shaft to one side of said frame member and operatively associated with one only of said rotatable beater elements.

10. A beater or the like device comprising a substantially bifurcated but integral cast metal frame member, the two branches of which are joined by a handle carrying portion, the ends of the branches being provided with means for receiving rods upon which rotatable beater elements are mounted, intermediate parts of said branches respectively being formed to provide spaced bearings, rotatable means mounted in said bearings for operating said beater elements, and means positioned between said ends of said branches integrally formed therewith for attaching bowl covering means.

In testimony whereof I have signed my name to this specification.

ALBERT W. ROUND.